United States Patent [19]

Segawa

[11] Patent Number: 5,419,991
[45] Date of Patent: May 30, 1995

[54] METHOD OF MANUFACTURING A LIQUID CRYSTAL DISPLAY

[75] Inventor: Yuji Segawa, Kanagawa, Japan

[73] Assignee: Sony Corporation, Tokyo, Japan

[21] Appl. No.: 246,463

[22] Filed: May 18, 1994

Related U.S. Application Data

[63] Continuation of Ser. No. 992,977, Dec. 18, 1992, abandoned.

[30] Foreign Application Priority Data

Dec. 19, 1991 [JP] Japan .................................. 3-354803

[51] Int. Cl.⁶ .............................................. G02F 1/133
[52] U.S. Cl. ...................................... 430/20; 430/321; 430/330; 430/312; 430/314
[58] Field of Search .................. 430/20, 321, 324, 325, 430/326, 330, 312, 314; 359/67, 81; 156/661.1

[56] References Cited

U.S. PATENT DOCUMENTS

| | | | |
|---|---|---|---|
| 4,725,517 | 2/1988 | Nakanowatari et al. | 430/20 |
| 4,812,387 | 3/1989 | Suzuki et al. | 430/311 |
| 4,873,175 | 10/1989 | Suzuki et al. | 430/311 |
| 4,929,060 | 5/1990 | Sugimoto et al. | 359/75 |
| 4,948,706 | 8/1990 | Sugihara et al. | 430/311 |
| 5,120,623 | 6/1992 | Brosig et al. | 430/20 |
| 5,169,737 | 12/1992 | Haws | 430/7 |
| 5,348,828 | 9/1994 | Murata et al. | 430/20 |

FOREIGN PATENT DOCUMENTS

| | | | |
|---|---|---|---|
| 57-034522 | 2/1982 | Japan | 359/67 |
| 62-135809 | 6/1987 | Japan | 430/20 |
| 63-098634 | 4/1988 | Japan | 430/20 |
| 63-228126 | 9/1988 | Japan | 359/81 |
| 63-231315 | 9/1988 | Japan | 359/67 |
| 2-204717 | 8/1990 | Japan | 359/67 |

OTHER PUBLICATIONS

English language Abstract of JP3-184022, Okamoto et al., (Aug. 1991).
English language Abstract of JP 62-087936, Komuro, (Apr. 1987).
Jinno et al., "Baking Characteristics of Positive Photoresists", Photographic Sci. and Eng., vol. 21, No. 5, pp. 290-292 (1977).

Primary Examiner—Charles L. Bowers, Jr.
Assistant Examiner—John A. McPherson
Attorney, Agent, or Firm—Hill, Steadman & Simpson

[57] ABSTRACT

The present invention provides a method of manufacturing a matrix liquid crystal panel provided with picture element electrodes arranged in a matrix and a black mask covering spaces between the picture element electrodes, capable of forming the black mask in accurate resister relative to the picture element electrodes through simple processes. In manufacturing the liquid crystal panel, a conductive transparent layer is formed over one of the major surfaces of a substrate, a positive resist film is formed in a pattern corresponding to the arrangement of the picture element electrodes, the conductive transparent layer is patterned, using the positive resist film as a mask, a negative resist film containing pigment is formed over the major surface of the substrate so as to cover the positive resist film and spaces between the picture element electrodes, the negative resist film is exposed to light projected from behind the other major surface of the substrate so that only portions of the negative resist film coating the spaces between the picture element electrodes are exposed to light and polymerized, and then portions of the negative resist film screened from the light by the positive type of resist material film are removed to pattern the negative resist film in a black mask.

15 Claims, 6 Drawing Sheets

⇧
EXPOSURE

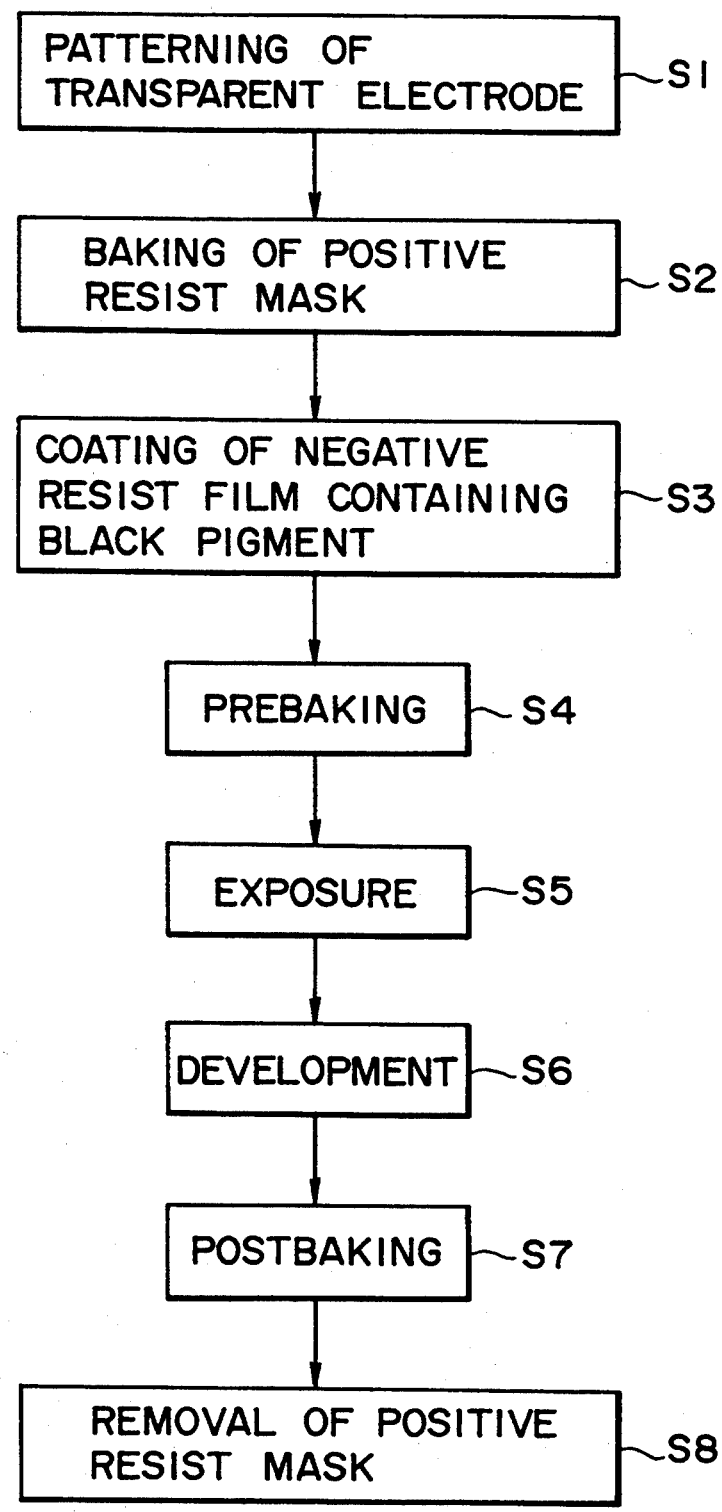

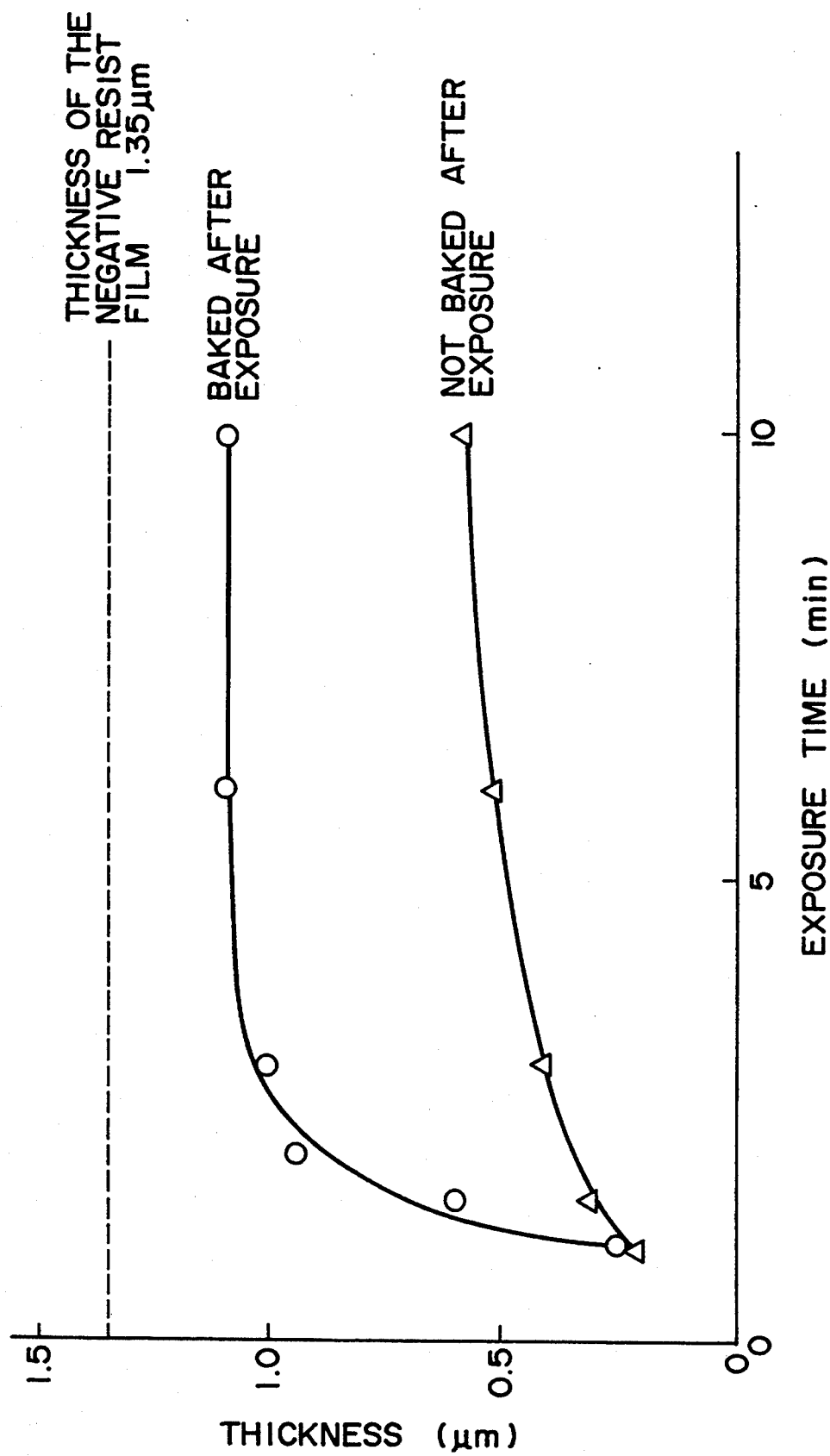

METHOD OF MANUFACTURING A LIQUID CRYSTAL DISPLAY

This is a continuation of application Ser. No. 07/992,977, filed Dec. 18, 1992, now abandoned.

BACKGROUND OF THE INVENTION

1. Field of the Invention

The present invention relates to a method of manufacturing a liquid crystal panel of a matrix type having picture element electrodes arranged in rows and columns and, more specifically, to a method of manufacturing a liquid crystal panel having picture element electrodes arranged in rows and columns, and a black matrix or a black mask for shading blank spaces formed between the picture element electrodes.

2. Description of the Prior Art

A liquid crystal panel having transparent electrodes is provided with a black mask formed on a substrate to prevent the degradation of the contrast of an image displayed thereon by light transmitted through blank spaces between the transparent electrodes. Methods of forming a black mask are classified roughly into three categories. A method of a first category forms a black mask by patterning a metal thin film, such as a chromium thin film, by a photolithographic etching process. A method of a second category forms a black mask by spreading a photoresist material containing particles of black pigment dispensed therein in a photoresist film over the surface of a substrate and patterning the photoresist film by a photographic process. A method of a third category forms a black mask by printing black ink over the surface of a substrate in a film by an offset printing process and subjecting the film of the black ink to a heating process. The method of the third category is disclosed in, for example, Japanese Patent Laid-open (Kokai) No. She 63-180933.

The method of the first category comprises a film forming process for forming a metal thin film, such as a chromium thin film, over the surface of a substrate by sputtering or vacuum evaporation, a photoresist film forming process for forming a photoresist film over the metal thin film, a photographic process for forming a photoresist mask by patterning the photoresist film, an etching process for etching the metal thin film in the pattern of a black mask, and a coating process for forming an overcoating layer or an insulating layer over the black mask of the metal thin film to insulate the black mask from the transparent electrodes to be formed over the metal thin film. Since the number of processes of the method of the first category is relatively large, the manufacturing cost of the black mask is relatively high.

The method of the second category also needs many processes. For example, a photoresist material containing particles of pigment dispersed therein is spread over the surface of a glass substrate by a spin coating process or a printing process to form a photoresist film. After prebaking the photoresist film, an oxygen-shielding material, such as PVA, is applied to the photoresist film to prevent free radicals produced in the photoresist film when the photoresist film is exposed to light from being deactivated through reaction between the free radicals and oxygen, the photoresist film is prebaked again, the photoresist film is exposed, using a photomask, the exposed photoresist film is processed by a photographic process, and then the photoresist film is subjected to a postbaking process to finish a black mask. Then, the black mask is coated with a overcoating layer.

Then, a transparent conductive film is formed over the coating layer, a photoresist film is formed over the transparent conductive layer, and then the photoresist film is patterned in a positive photoresist mask, using a photomask. The photomask must be correctly registered relative to the black mask. If the photomask is registered incorrectly, gaps will be formed between the black mask and transparent electrodes formed by patterning the transparent conductive film. Light transmitted through the gaps deteriorates the contrast of an image displayed on the liquid crystal panel having such incorrectly patterned transparent electrodes. A technique proposed previously to prevent forming such gaps forms the black mask by a relatively thick lines so that the lines forming the black mask over lap the edges of the transparent electrodes. Although the black mask having such relatively thick lines facilitates registering the photomask relative to the black mask, the numerical aperture of the picture element electrodes is reduced.

The method of the third category forms a black mask simply by printing black ink by offset printing and hence the number of processes of the method of the third category is relatively small. However, the printing accuracy of offset printing is lower than the accuracy of patterning the transparent conductive film. Therefore, the method of the third category, similarly to the method of the second category is obliged to sacrifice the numerical aperture of the picture element electrodes to compensate errors in registering the printed black mask relative to the pattern of the transparent electrodes.

SUMMARY OF THE INVENTION

The present invention has been made in view of the foregoing problems in the prior art methods and it is therefore an object of the present invention to provide a method of manufacturing a liquid crystal panel, comprising a relatively small number of processes and capable of forming black mask in correct register relative to the pattern of transparent electrodes.

The present invention forms a black mask after perfectly covering blank spaces between picture element electrodes. Accordingly, the black mask has a high light-shielding ratio and enhances the contrast of an image displayed on the liquid crystal panel. Furthermore, since the present invention uses a positive resist mask for patterning a transparent conductive film to form the picture element electrodes for forming the black mask, a process of registering a mask for forming the black mask relative to the pattern of the picture element electrodes becomes unnecessary.

According to one aspect of the present invention there is provided a method of manufacturing a liquid crystal panel comprising the step of: disposing a conductive transparent layer on an insulating substrate; patterning the conductive transparent layer to form a transparent electrode pattern, each transparent electrode having a resist film thereon; forming a resist layer over the resist film; and patterning the resist layer to define a light-shielding layer between adjacent transparent electrodes by exposing from a back side of the insulating substrate.

According to another aspect of the present invention there is provided a method of manufacturing an electro-optical device which comprises a first and second substrates and an electro-optical material layer sandwiched between the substrates, comprising the step of: disposing a conductive transparent layer on the first substrate: patterning the conductive transparent layer to form a transparent electrode pattern, each transparent electrode having a resist film thereon; forming a resist layer over the resist film; and patterning the resist layer to define a light-shielding layer between adjacent transparent electrode by exposing from the back side of the first substrate.

BRIEF DESCRIPTION OF THE DRAWINGS

The above and other objects, features and advantages of the present invention will become more apparent from the following description taken in connection with the accompanying drawings, in which:

FIG. 2 is a flow chart showing the steps of the method of manufacturing a liquid crystal panel, in a preferred embodiment according to the present invention;

FIG. 3 is a graph of assistance in explaining a method of adjusting the thickness of a black mask;

DESCRIPTION OF THE PREFERRED EMBODIMENTS

Figure 1A:
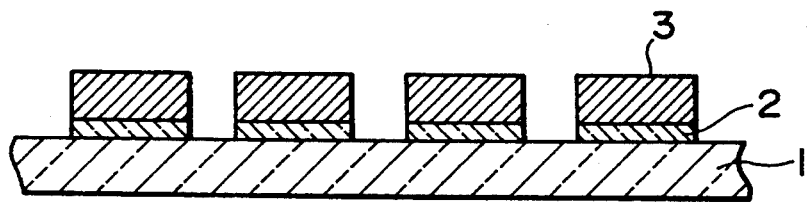
FIGS. 1A–1D are schematic sectional views for assistance in explaining steps of a method of manufacturing a liquid crystal panel, in a preferred embodiment according to the present invention.
Figure 1B:
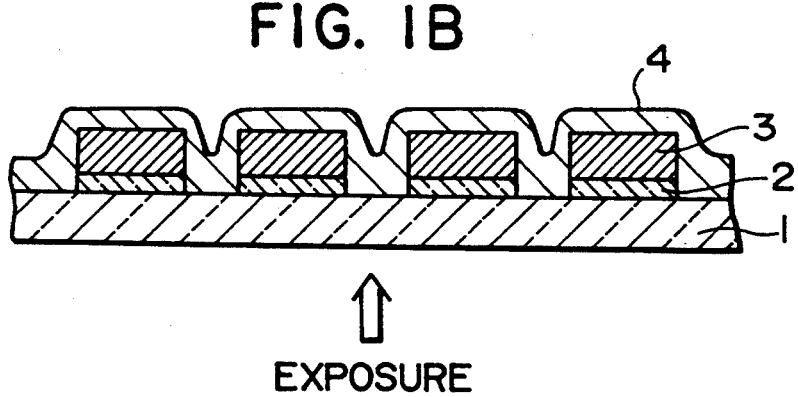
Figure 1C:
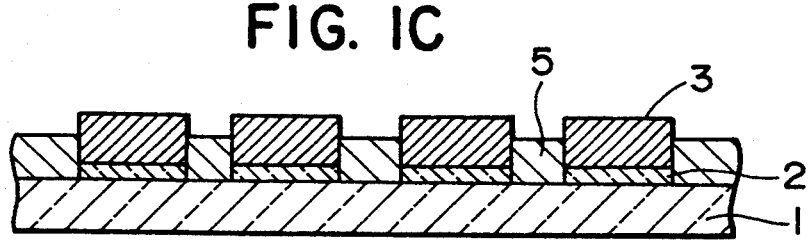
Figure 1D:
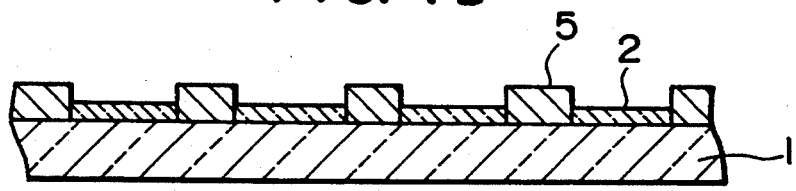

Referring to FIG. 1A, a transparent conductive film of ITO or the like is formed over the surface of a glass substrate 1, i.e., a insulating substrate, a positive photoresist mask 3 is formed over the transparent conductive film, and then the transparent conductive film is etched selectively to form transparent electrodes 2. A photosensitive resist film 4 (FIG. 1B) of a photosensitive resin containing black pigment or a colored photosensitive resin is formed over the surface of the glass substrate 1 so as to coat the exposed portions of the surface of the glass substrate 1, the picture element electrodes 2 and the positive photoresist mask 3. Then the photosensitive resist film 4 is exposed by irradiating the glass substrate 1 from behind the back surface of the glass substrate 1, in which the positive photoresist mask 3 serves as a mask for coating portions of the photosensitive resist film 4. Portions of the photosensitive resist film 4 not screened by the positive photoresist mask 3 are exposed to light and hardens. Portions of the photosensitive resist film 4 other than the portions of the same exposed to light and hardened are removed by a photographic process to form a black mask 5 (FIG. 1C). Then, the positive resist mask 3 is removed to complete a picture element electrode (FIG. 1D). Another picture element electrode is formed by the same processes.

The two picture element electrodes are put together so that a gap of a predetermined thickness is formed between the picture element electrodes and the picture element electrodes of one of the picture element electrode are in register respectively with the corresponding picture element electrodes of the other picture element electrode, and a liquid crystal is sealed in the gap between the two picture element electrodes to complete a liquid crystal plate.

The black mask 5 can be formed in a desired thickness by regulating the radiant exposure on the photosensitive resist film 4. For example, it is possible to form the black mask 5 in a thickness that will make the transmissivity of the liquid crystal, which is dependent on $\Delta n.d$, where $\Delta n$ is the quantity of double refraction of the liquid crystal and d is the thickness of the liquid crystal layer, substantially zero. The black mask 5 may be formed in a thickness corresponding to the distance between the inner surfaces of the glass substrates 1 of the opposite picture element electrodes to use the black mask as a spacer.

Steps of forming a black mask, which are the essential steps among those of the method of manufacturing a liquid crystal plate in accordance with the present invention, will be described hereinafter with reference to FIG. 2.

A transparent conductive film of a transparent conductive material, such as ITO, is formed over the surface of a glass substrate by sputtering or vacuum evaporation. A film of a positive type of resist material, such as a mixture of novolac resin and a quinoneazide compound (sensitive material) (PMER manufactured Tokyo Ohka K. K.), which material has the withstand temperature on the order of 130° C., is formed over the transparent conductive film, the positive resist film is patterned to form a positive resist mask, and then the transparent conductive film is etched in step S1 to form picture element electrodes.

In step S2, the positive resist mask is baked at a temperature on the order of 240° C. for one hour to harden the positive resist masks namely, to promote the polymerization of the resin, such as the phenol resin, and to carbonize the sensitive material and the dye. When baked, the positive resist mask turns reddish brown. The baked positive resist mask can be easily removed.

In step S3, a negative resist film of a negative type of resist material containing black pigment is formed over the entire surface of the glass substrate by spin coating or printing. Any suitable photosensitive color resist material capable of screening light may be used instead of the negative type of resist material containing black pigment. The photosensitive negative type of resist material may be a photosensitive acrylic resin of a photosensitive polyimide resin. In step S4, the negative resist film is prebaked.

In step S5, the glass substrate is irradiated from behind the back surface thereof by ultraviolet rays, for example, i rays of 365 nm in wavelength, using the reddish brown positive resist mask to expose portions of the negative resist film corresponding to spaces between the transparent electrodes at an exposure intensity of, for example, 1.67 mW/cm2. If necessary, the negative resist film may be subjected to postexposure baking (PEB) to promote the polymerization of monomer radicals produced by exposure. In PEB, the negative resist film is heated at a temperature in the range of 90° C. to 110° C. for six minutes.

In step S6, the negative resist film is developed by using, for example, an alkali solution, such as an aqueous solution of sodium carbonate, of a concentration of about 1%. Since the solution velocity of the unhardened negative type of resist material in the 1% alkali solution is higher by far than that of the baked positive type of resist material, the positive resist mask will not be dissolved together with the negative resist film. Consequently, the negative resist film is patterned so as to fill up the spaces between the transparent electrodes.

In step S7, the patterned negative resist film is subjected to postbaking to eliminate the solvent so that the patterned negative resist film is perfectly resinified. A negative type of resist material containing an acrylic resin as a principal component is resinified or hardened perfectly when heated at 240° C. for one hour for postbaking. The postbaked negative resist film is resistant to alkali.

In step S8, the positive resist mask is removed by using, for example, an alkali solution (aqueous solution of potassium hydroxide) of a concentration of on the order of 15%. Since the withstand temperature of the positive type of resist material is on the order of 130° C. and the positive resist mask is carbonized and the adhesion of the same to the transparent electrodes is reduced when heated at 240° C. for postbaking, the positive resist mask can be easily removed when treated by the alkali solution. Since the negative resist film is perfectly resinified by postbaking, the negative resist film withstands the alkali treatment. Thus, the black mask can be formed so as to cover only the spaces between the transparent electrodes by using the positive resist mask used for forming the transparent electrodes. Although the method has been described as applied to manufacturing a monochromatic liquid crystal panel, the present invention is applicable also to manufacturing a color liquid crystal panel. When manufacturing a color liquid crystal panel, a color filter is formed over the transparent conductive film before patterning the transparent conductive film.

The black mask needs to be formed in a predetermined thickness for some liquid crystal panel. A method of forming the black mask in a desired thickness will be described with reference to FIG. 3.

The thickness of the black mask is dependent on the radiant exposure, i.e., the product of exposure intensity and exposure time, on the resist film of a negative type of resist material containing black pigment. When the resist film is exposed to ultraviolet rays, free radicals are produced and polymerization of monomer radicals occurs in the resist film. Since the resist film contains black pigment, ultraviolet rays are not transmitted through the resist film, free radicals are produced only in the irradiated surface of the resist film and chain reaction for polymerization between the monomer radicals starts from the surface of the resist film. Since the resist film is exposed to ultraviolet rays projected from behind the back surface of the glass substrate, chain reaction for the polymerization between monomer radicals starts from the surface of the resist film contiguous with the front surface of the glass substrate and propagates toward the other surface of the resist film. The depth of propagation of the chain reaction, namely, the thickness of the black mask, is proportional to exposure intensity and exposure time.

FIG. 3 shows the measured variation in the thickness of a sample black mask completed by simply exposing the resist mask to ultraviolet rays and a sample black mask completed by subjecting the resist film to PEB after exposure with exposure time when exposure intensity was 1.67 mW/cm². Heat applied by PEB to the resist film promotes the chain reaction between the monomer radicals. As shown in FIG. 3, the thickness of the sample black mask completed by subjecting the resist film to PEB after exposure is greater than that of the other sample black mask. It is impossible to form the black mask in a thickness as large as that of the resist film as formed on the glass substrate, because free radicals in the surface of the colored resist film react with oxygen and the free radicals are deactivated. As shown in FIG. 3, the maximum thickness of the sample black mask completed by subjecting the resist film to PEB after exposure is 1.1 μm when the thickness of the resist film as formed is 1.35 μm. It is inferred that the free radicals in the surface layer of 0.25 μm in thickness were deactivated by reaction with oxygen.

Figure 4:
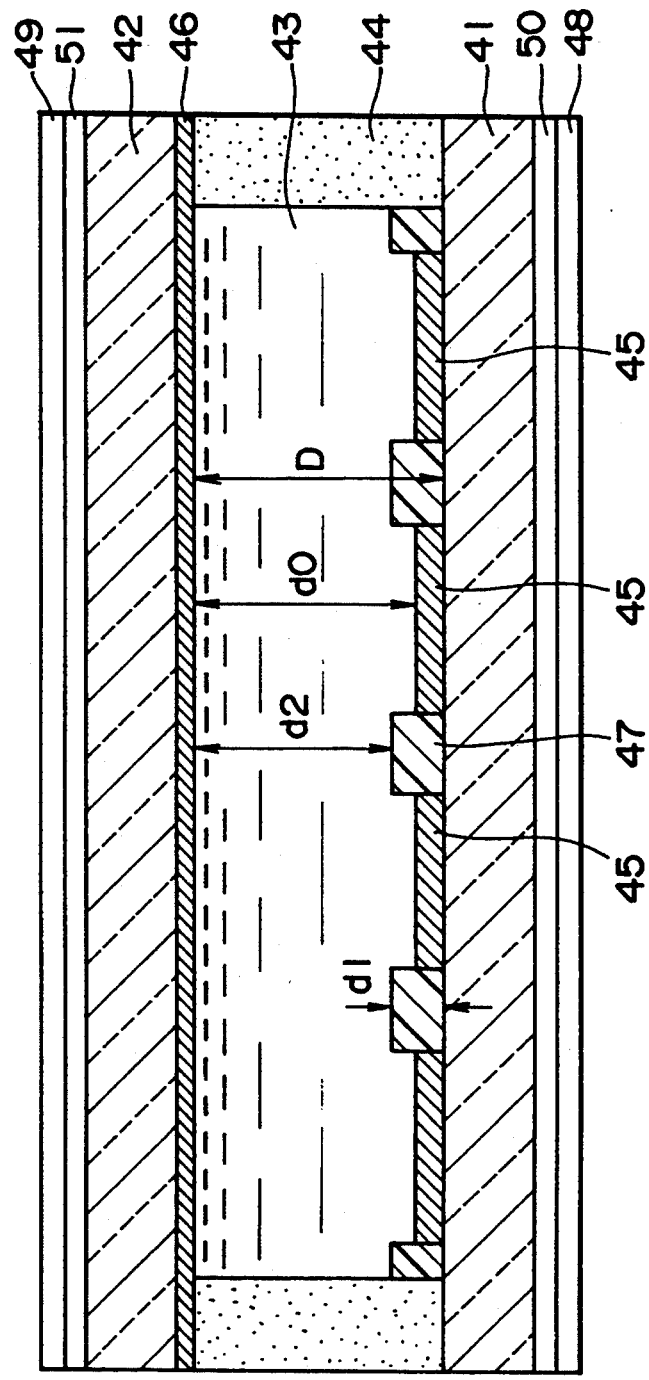
FIG. 4 is a schematic cross sectional view of a liquid crystal panel in a first example manufactured by the method in accordance with the present invention.

FIG. 4 shows a supertwist nematic liquid crystal panel of a matrix type in a first example having a glass substrate provided with a black mask formed by the method of the present invention. This liquid crystal panel comprises a first glass substrate 41, a second glass substrate 42 and a liquid crystal layer 43 of a supertwist nematic construction sealed in the space between the first glass substrate 41 and the second glass substrate 42. The space between the glass substrates 41 and 42 is sealed by a sealing member 44. Row electrodes 45 are formed at predetermined intervals on the inner surface of the first glass substrate 41 by patterning a conductive transparent layer, and column electrodes 46 are formed so as to extend perpendicularly to the row electrodes 45 on the inner surface of the second glass substrate 42. A black mask 47 is formed by the method of the present invention on the inner surface of the first glass substrate 41 so as to cover spaces between the adjacent row electrodes 45, and another black mask, not shown, is formed by the method of the present invention on the inner surface of the second glass substrate 42 so as to cover spaces between the adjacent column electrodes 46.

The intersections of the row electrodes 45 and the column electrodes 46 serve as pixels. The thickness dO of a portion of the liquid crystal layer 43 corresponding to the pixel is determined so that the ratio between transmissivity when the pixel is selected and transmissivity when the pixel is not selected is a maximum. A cell gap D in a blank portion, i.e., a portion between the space between the adjacent row electrodes 45 and the column electrode 46, is equal to a value obtained by subtracting the thickness of the row electrodes 45 from the thickness dO. The transmissivity of the liquid crystal layer 43 is greatly dependent on $\Delta n.d$, where $\Delta n$ is the quantity of double refraction of the liquid crystal or a quantity representing the anisotropy of the refractive index of the liquid crystal and d is the thickness of the liquid crystal layer 43. If no portion of the black mask is not formed in a space corresponding to the blank portion, the product of the quantity of double refraction of the liquid crystal and the thickness of the liquid crystal layer in the blank portion is $\Delta n.D$. However, in general, it is impossible to make $\Delta n.D$ an optimum value and hence it is impossible to reduce the transmissivity to a minimum. On the other hand, the thickness d2 of the liquid crystal layer 43 in the blank portion that will make the transmissivity a minimum can be determined if $\Delta n$ is known. Generally, the transmissivity of a black mask of a thickness on the order of 1 μm is in the range of 4 to 5% and the black mask is unable to screen light perfectly, even if the black mask is formed by patterning a resist film containing black pigment. A portion of the liquid crystal layer 43 can be formed in the thickness d2 by adjusting the thickness d1 of the black mask 47 to prevent the leakage of light through the blank portion effectively. As is obvious from FIG. 4, $d1=D-d2$. An image can be displayed on the liquid crystal panel in a satisfactorily high contrast by determining the thickness d1 of the black mask 47 so that the value of the $\Delta n.d$ of the liquid crystal layer 43 makes the transmissivity of portions of the liquid crystal layer 43 corresponding to the spaces between the adjacent transparent electrodes 0%, even if the black mask is not able to screen light perfectly. The determination of the value of $\Delta n.d$ by adjusting the thickness of the black mask is effective also when the black mask is formed by patterning a transparent photosensitive resin not having any property that causes double refraction, such as an epoxy resin, an acrylic resin or a polyimide resin.

The liquid crystal panel of a supertwist nematic type shown in FIG. 4 is provided with a first phase plate 50 and an second phase plate 51 attached, respectively, to the respective outer surfaces of the first glass plate 41 and the second glass substrate 42 to prevent the coloring of the liquid crystal panel. In the liquid crystal panel of a supertwist nematic type as shown in FIG. 4, the change of the alignment of molecules in the liquid crystal layer 43 causes the change of transmissivity. Therefore, a first polarizing plate 48 and a second polarizing plate 49 are attached, respectively, to the respective outer surface of the first glass substrate 41 and the second glass substrate 42.

Figure 5:
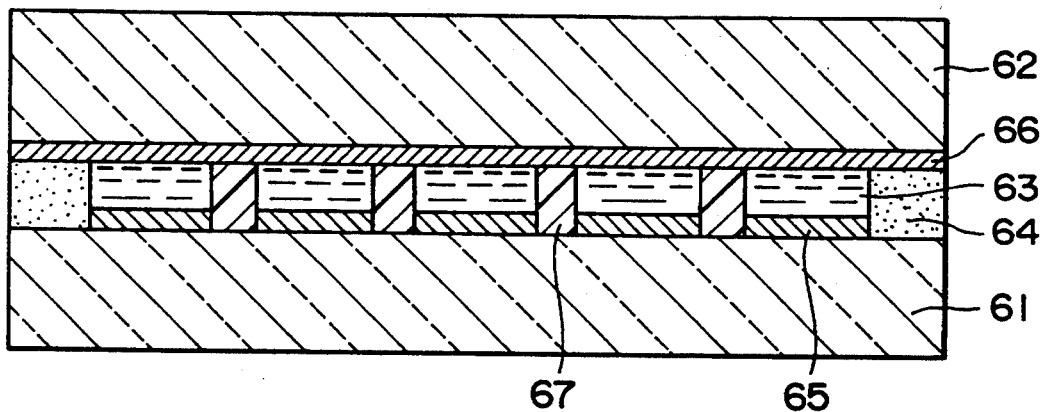
FIG. 5 is a schematic cross sectional view of a liquid crystal panel in a second example manufactured by the method in accordance with the present invention.

FIG. 5 shows a liquid crystal panel in a second example manufactured by the method of the present invention. The liquid crystal panel comprises a first glass substrate 61, a second glass substrate 62, a liquid crystal layer 63 sealed in the space between the glass substrates 61 and 62, and a sealing member 64 sealing the liquid crystal layer 63 in the space between the glass substrates 61 and 62. Row electrodes 65 are formed at predetermined intervals on the inner surface of the first glass substrate 61, and column electrodes 66 are formed at predetermined intervals on the inner surface of the second glass substrate 62 so as to extend perpendicularly to the row electrodes 65. A black mask 67 is formed on the inner surface of the first glass substrate 61 by the method of the present invention so as to cover spaces between the adjacent row electrodes 65. Similarly, another black mask, not shown, is formed on the inner surface of the second glass substrate 62 by the method of the present invention so as to cover spaces between the adjacent column electrodes 66. Recesses are formed in the component lines of one of the black masks at the intersections of the respective component lines of the black masks so that the respective component lines of the black masks may not interfere with each other. The thickness of the black mask 67 is equal to the predetermined thickness of the liquid crystal layer 63; that is, the black mask 67 serves as a spacer for determining the thickness of the space between the respective inner surfaces of the first glass substrate 61 and the second glass substrate 62. Therefore, spacing particles need not be spread over the surface of the first glass substrate 61, a spacing particle spreading process is omitted, the deterioration of the contrast of an image displayed on the liquid crystal panel due to the diffusion of light caused by spacing particles can be avoided, and the disturbance of the alignment of the liquid crystal due to the effect of an electric field that occurs when the pixels are very small and the distance between the adjacent transparent electrodes is very small can be avoided.

Figure 6:
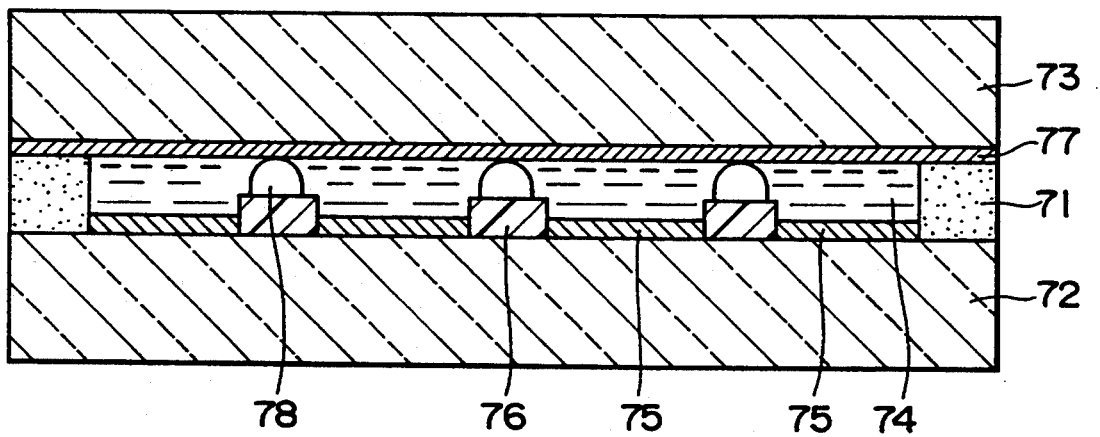
FIG. 6 is a schematic cross sectional view of a liquid crystal panel in a third example manufactured by the method in accordance with the present invention.

FIG. 6 shows a liquid crystal panel in a third example manufactured by the method of the present invention. The liquid crystal panel comprises a first glass substrate 72, a second glass substrate 73, a liquid crystal layer 74 sealed in the space between the first glass substrate 72 and the second glass substrate 73, and a sealing member 71 sealing the liquid crystal layer 74 in the space between the first glass substrate 72 and the second glass substrate 73. Row electrodes 75 are formed on the inner surface of the first glass substrate 72, a black mask 76 is formed on the inner surface of the first glass substrate 72 by the method of the present invention so as to cover spaces between the adjacent row electrodes 75, column electrodes 77 are formed on the inner surface of the second glass substrate 73, and a black mask, not shown, is formed on the inner surface of the second glass substrate 73 by the method of the present invention so as to cover spaces between the column electrodes 77. A color resist material forming the black mask 76 contains spacing particles 78, such as micropearls or glass fibers. The outside diameter of the spacing particles 78 is equal to the thickness of the space between the respective inner surfaces of the first glass substrate 72 and the second glass substrate 73. Since the black mask 76 contains the spacing particles 78, a spacing particle spreading process is omitted and the deterioration of the contrast of an image displayed on the liquid crystal panel due to the diffusion of light by the spacing particles spread in portions corresponding to the pixels can be avoided. Furthermore, the transmissivity of the liquid crystal layer 74 can be made 0% by forming the colored resist film in an appropriate thickness.

Figure 7:
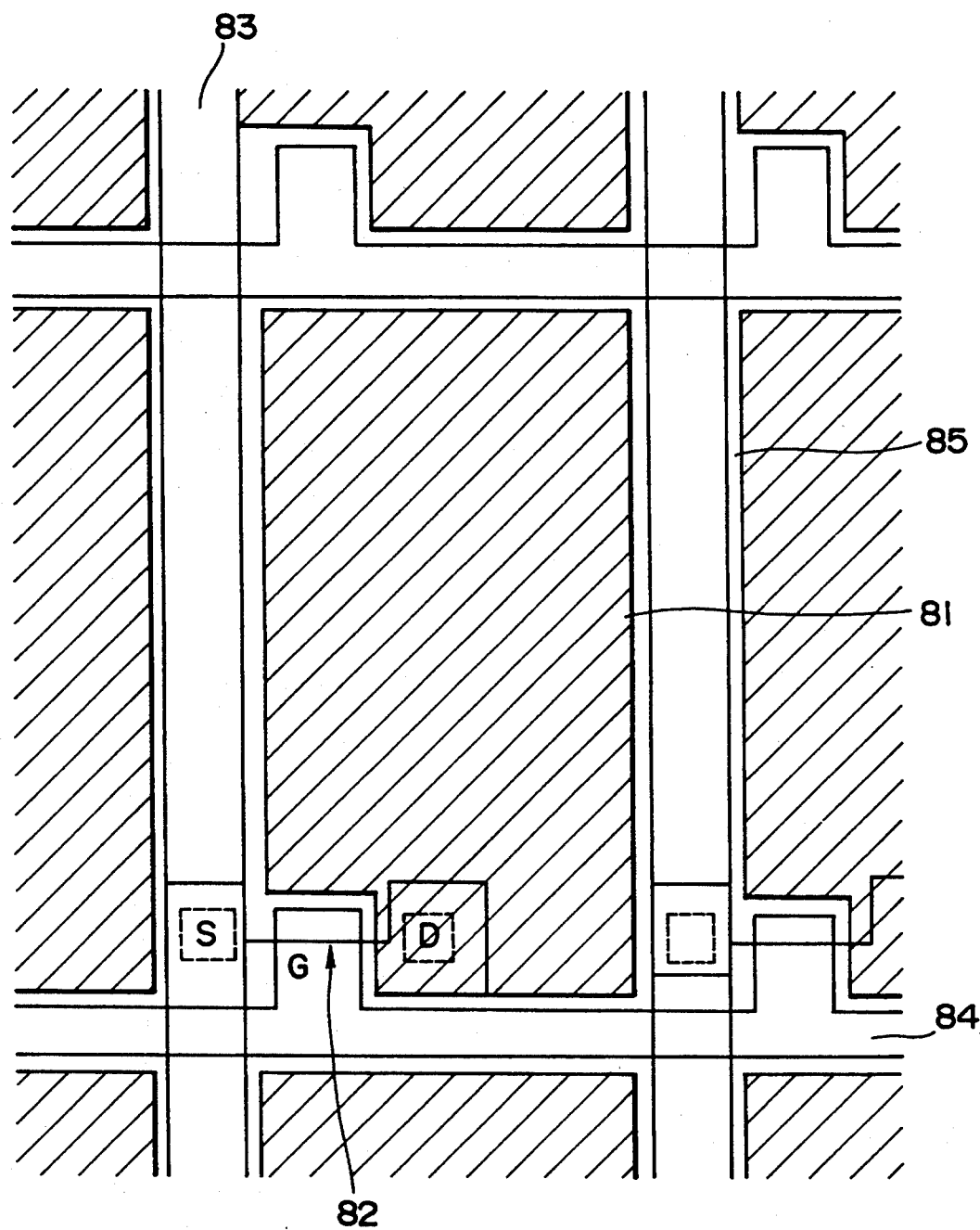
FIG. 7 is a schematic cross sectional view of a liquid crystal panel in a fourth example manufactured by the method in accordance with the present invention.

FIG. 7 shows an active matrix liquid crystal panel in a fourth example manufactured by the method of the present invention. Separate transparent electrodes 81, conductive material are formed in a matrix on the inner surface of a insulating substrate, such as a quartz substrate. A thin-film transistor 82 is disposed in connection with each picture element electrode 81. Signal lines 83 are extended between adjacent columns of the picture element electrodes 81, and scanning lines 84 are extended between adjacent rows of picture element electrodes 81. Each thin-film transistor 82 has a source region S connected to the signal line 83, a drain region D connected to the corresponding picture element electrode 81, and a gate electrode G continuous with the scanning line 84. A black mask 85 is formed by patterning a resist film by the method of the present invention so as to cover spaces between the adjacent picture element electrodes 81. In forming the black mask 85, a positive resist mask used for forming the picture element electrodes 81 is used as a mask. Therefore, any additional mask for forming the black mask 85 need not be formed and a process of registering a mask for forming the black mask 85 is not necessary. Since the black mask 85 need not be provided with margin overlapping the picture element electrodes 81, the picture element electrodes 81 have a relatively large aperture ratio.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of manufacturing a liquid crystal panel which has a transparent conductive electrode pattern on an insulating substrate, the method comprising the steps of:

forming a conductive transparent layer on a surface of the insulating substrate;

forming a positive resist layer on the conductive transparent layer, forming a mask of the positive resist layer on the surface of a selected area of the conductive transparent layer;

etching the conductive transparent layer using the mask of positive resist to form an electrode pattern comprising transparent conductive electrodes with a remaining positive resist layer left on each electrode and exposed portions of the insulating substrate therebetween;

baking the remaining positive resist layer;

then forming a color resist layer over the remaining positive resist layer and the exposed portions to cover all of the surface of the insulating substrate;

exposing a light through a backside of the insulating substrate to selectively cure the color resist layer by using the remaining positive resist layer as a mask;

removing the uncured portion of the color resist layer to thereby form a light shielding layer between adjacent transparent conductive electrodes; and then removing the remaining positive resist layer.

2. A method of manufacturing a liquid crystal panel as claimed in claim 1, wherein said color resist layer includes spacers.

3. A method of manufacturing a liquid crystal panel as claimed in claim 1, where said color resist layer serves as a black mask.

4. A method of manufacturing a liquid crystal panel as claimed in claim 1, wherein said color resist layer is formed of a negative resist material.

5. A method of manufacturing a liquid crystal panel as claimed in claim 1, wherein said color resist layer is formed of a pigment-dispersed resist material.

6. A method of manufacturing a liquid crystal panel as claimed in claim 1, wherein said step of forming a mask is by subjecting the positive resist layer to a selective exposure and to a development to form the mask of a positive resist pattern.

7. A method of manufacturing a liquid crystal panel as claimed in claim 1, wherein said color resist layer is pre-baked before the exposure.

8. A method of manufacturing a liquid crystal panel as claimed in claim 7, wherein said color resist layer is post-baked after the exposure.

9. A method of manufacturing a liquid crystal panel as claimed in claim 1, wherein said light is ultraviolet light.

10. A method of manufacturing a liquid crystal display device which comprises a first substrate, a second substrate opposed to the first substrate, and a liquid crystal layer sandwiched between the substrates, the method comprising the steps of:

forming a conductive transparent layer on a surface of the first substrate;

forming a positive resist layer on the conductive transparent layer;

patterning the positive resist layer on the conductive transparent layer to form a mask of a positive resist;

etching to form a transparent conductive electrode pattern comprising transparent conductive electrodes and a remaining positive resist layer left thereon by using the mask;

then baking the mask of the positive resist layer;

forming a color resist layer over the mask and area of the surface free of the mask;

exposing a light through a backside of the first substrate to selectively cure the color resist layer by using the mask of the remaining positive resist layer as an exposure mask;

removing the uncured portion of the color resist layer to thereby form a light shielding layer between adjacent transparent conductive electrodes; and removing the remaining positive resist layer; and combining the first substrate with the second substrate with a liquid crystal layer therebetween.

11. A method of manufacturing a liquid crystal display device as claimed in claim 10, wherein said light shielding layer has a thickness so as to determine a retardation having a value so that the transmissivity of the liquid crystal layer positioned between first and second substrates is zero.

12. A method of manufacturing a liquid crystal display device as claimed in claim 10, wherein said color resist layer has spacer means for spacing the substrates apart.

13. A method of manufacturing a liquid crystal display device as claimed in claim 10, wherein said color resist layer has a thickness so as to space the substrates apart.

14. A method of manufacturing a liquid crystal display device as claimed in claim 10, wherein said color resist layer serves as a black mask.

15. A method of manufacturing a liquid crystal display device as claimed in claim 10, wherein said uncured portion of the color resist layer is baked before the removing.

* * * * *